A. A. WALKER.
Stove-Pipe Damper Regulator.

No. 211,810. Patented Jan. 28, 1879.

Witnesses.
S. N. Piper
Geo. H. Cooley

Inventor,
Alvin A. Walker.
by attorney
R. H. Eddy

UNITED STATES PATENT OFFICE.

ALVIN A. WALKER, OF WOLLASTON HEIGHTS, MASSACHUSETTS.

IMPROVEMENT IN STOVE-PIPE-DAMPER REGULATORS.

Specification forming part of Letters Patent No. 211,810, dated January 28, 1879; application filed December 9, 1878.

*To all whom it may concern:*

Be it known that I, ALVIN A. WALKER, of Wollaston Heights, of the county of Norfolk and State of Massachusetts, have invented a new and useful Stove-Pipe-Damper Regulator or Attachment; and do hereby declare the same to be described in the following specification and represented in the accompanying drawings, of which—

Figure 1:
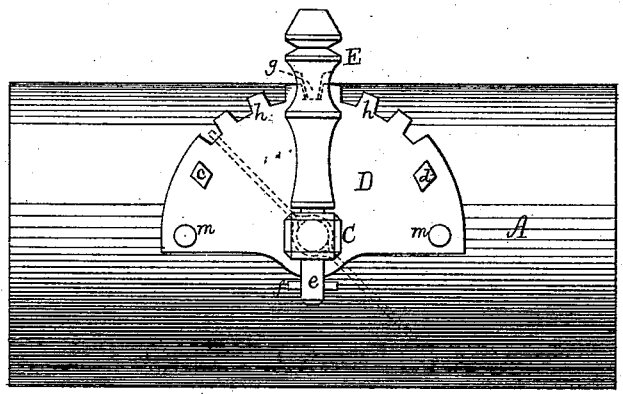
Figure 2:
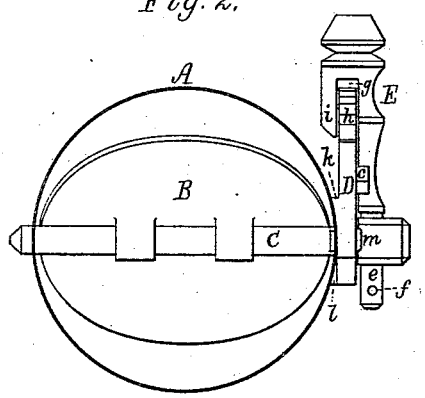
Figure 3:
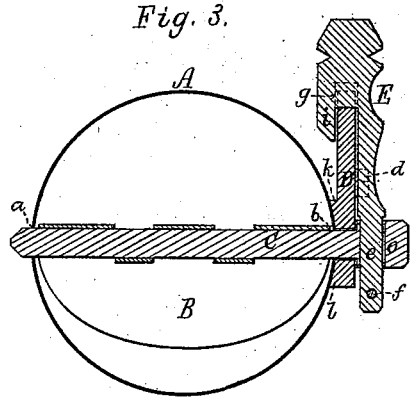

Figure 1 is a front elevation; Fig. 2, an end view, and Fig. 3 a transverse section of it as applied to a stove-pipe.

It is composed, mainly, of a toothed sector, a perforated bolt or spindle, and a slide pawl or catch, all constructed, arranged, and applied essentially as set forth.

In the drawings, A denotes the stove-pipe, and B its damper, the latter being applied to the perforated spindle or bolt C, which extends diametrically across such damper and through holes $a\ b$, made in the pipe. The said bolt or spindle also projects loosely through the toothed sector D, which is fastened to the pipe on its outer surface, and provided with two stops or lugs, $c\ d$, arranged as represented, they being to determine the extremes of motion of the catch. This slide pawl or catch E has its shank $e$ going loosely and transversely through the bolt-head, which has a hole, $o$, in it for reception of such shank, a pin, $f$, going through the shank, serving, when against the head, to limit the upward lengthwise movement of the catch E. The said catch projects above and hooks around the toothed sector, in manner as represented, and is furnished with a tooth, $g$, to enter the space between any two next adjacent teeth of the arc of teeth $h$ of the sector.

On pulling the catch upward its shank will slide freely in the bolt, and the tooth of the catch will be drawn out of engagement with the sector, the hook $i$ serving to keep the catch from being bent or pulled laterally out of place relatively to the sector. On the catch having been so raised it may be moved along the sector, and after such movement be depressed so as to force the tooth into engagement therewith.

When the tooth of the catch is in one of the extreme notches of the sector, the damper will be closed, and it will be fully open when the tooth is in the other extreme notch, the damper being partially open when the tooth is in either of the intermediate notches. When the catch is in either of its two extreme positions it will be against one of the stops or lugs $c\ d$.

The toothed sector I form or furnish with ribs or ledges $k\ l$, on or projecting from its back, they being to bear against the stove-pipe and aid, with the fastening-rivets $m\ m$, to hold the sector in a proper position relatively to the pipe. Such ledges enable the sector to be readily adapted to a pipe of any diameter.

A helical or other proper spring may be applied to the catch-shank, to draw the catch into engagement with the arc of the sector, or prevent the catch from accidentally becoming disengaged from the said arc, such being particularly useful when the stove-pipe is vertical or somewhat inclined from a vertical line.

With my damper attachment a damper may be firmly held in position, so as not to be movable therefrom by a current in the pipe.

I claim as my invention as follows:

The combination of the toothed sector D, provided with the lugs or stops $c\ d$, arranged thereon as shown, with the perforated bolt C and the slide-catch E, applied to each other and the sector as represented.

ALVIN A. WALKER.

Witnesses:
R. H. EDDY,
S. N. PIPER.